US006665659B1

(12) United States Patent
Logan

(10) Patent No.: US 6,665,659 B1
(45) Date of Patent: Dec. 16, 2003

(54) METHODS AND APPARATUS FOR DISTRIBUTING AND USING METADATA VIA THE INTERNET

(76) Inventor: James D. Logan, 81 Castle Hill Rd., Windham, NH (US) 03087

( * ) Notice: Subject to any disclaimer, the term of this patent is extended or adjusted under 35 U.S.C. 154(b) by 0 days.

(21) Appl. No.: 09/495,103

(22) Filed: Feb. 1, 2000

(51) Int. Cl.$^7$ .......................... G06F 17/30; G06F 15/16
(52) U.S. Cl. ................... 707/3; 707/5; 709/201
(58) Field of Search ................. 709/203, 200, 709/201, 249; 707/3, 5

(56) References Cited

U.S. PATENT DOCUMENTS

| | | | | |
|---|---|---|---|---|
| 5,491,820 A | * | 2/1996 | Belove et al. ................. | 707/3 |
| 5,708,654 A | * | 1/1998 | Arndt et al. ................. | 370/242 |
| 5,930,791 A | * | 7/1999 | Leu ................. | 707/8 |
| 6,006,217 A | * | 12/1999 | Lumsden ................. | 707/2 |
| 6,006,332 A | * | 12/1999 | Rabne et al. ................. | 713/201 |
| 6,151,624 A | * | 11/2000 | Teare et al. ................. | 709/217 |
| 6,178,419 B1 | * | 1/2001 | Legh-Smith et al. ........ | 707/6 |
| 6,286,045 B1 | * | 9/2001 | Griffiths et al. ............ | 709/224 |
| 6,324,568 B1 | * | 11/2001 | Diec ................. | 709/203 |
| 6,334,126 B1 | * | 12/2001 | Nagatomo et al. ............. | 707/4 |
| 6,356,901 B1 | * | 3/2002 | MacLeod et al. ............. | 707/6 |
| 6,385,647 B1 | * | 5/2002 | Willis et al. ................. | 709/217 |
| 6,396,593 B1 | * | 5/2002 | Laverty et al. ............. | 358/1.15 |
| 6,418,448 B1 | * | 7/2002 | Sarkar ................. | 707/104.1 |
| 6,421,675 B1 | * | 7/2002 | Ryan et al. ................. | 707/100 |
| 6,434,548 B1 | * | 8/2002 | Emens et al. ................. | 707/3 |
| 6,442,598 B1 | * | 8/2002 | Wright et al. ............. | 709/217 |
| 6,446,110 B1 | * | 9/2002 | Lection et al. ............. | 709/203 |
| 6,453,339 B1 | * | 9/2002 | Schultz et al. ............. | 709/206 |
| 6,505,238 B1 | * | 1/2003 | Tran ................. | 709/208 |
| 6,546,388 B1 | * | 4/2003 | Edlund et al. ................. | 707/5 |
| 2002/0023010 A1 | * | 2/2002 | Rittmaster et al. ............ | 705/26 |
| 2002/0156869 A1 | * | 10/2002 | Wong et al. ................. | 709/219 |

OTHER PUBLICATIONS

Visual information retrieval from large distributed online repositories, Chang et al, Dec. 1997, Communications of the ACM, vol. 40, No. 12, pp. 63–71.*

* cited by examiner

Primary Examiner—Krisna Lim
(74) Attorney, Agent, or Firm—Charles G. Call

(57) ABSTRACT

A system for selectively distributing information from a multiplicity of Internet resources to a user in a way that make it easier for the user to quickly identify information of particular interest. The system employs a server for generating a central library of citations, each containing metadata that describes selected information from a resource identified by a URL. The server works in conjunction with a client computer which requests information on a topic or topics of interest by supplying preference data to the server. In response, the server delivers a subset of the citations to the client computer which match the preference data from the client. The client computer places this subset of citations in a local store where they may be compared with user requests by matching the metadata in each citation to criteria specified by the user. In addition, the locally stored citations may be sorted into an particular order in response to a user request. The filtered and sorted citations may then be used to present desired information to the user, either by displaying metadata contained in the citation or by using the URL in the citation to fetch relevant information via the Internet from the original resource.

19 Claims, 2 Drawing Sheets

METHODS AND APPARATUS FOR DISTRIBUTING AND USING METADATA VIA THE INTERNET

FIELD OF THE INVENTION

This invention relates to electronic information distribution systems and more particularly to a method for indexing, combining, managing and distributing information via the Internet.

BACKGROUND OF THE INVENTION

The Internet and the World Wide Web make a huge quantity of information available to the public at large, but better mechanisms are needed for directing the most useful information to those persons who have the greatest need or desire for it.

Hierarchical directories, such as the widely used Yahoo.com directory, help users find Web pages of interest by classifying Web sites in accordance with a hierarchical subject-matter classification system. Typically, at the time a given Web site is registered with the directory, the operator of a Web site selects an existing category which is most nearly descriptive of the content being made available. Human reviewers employed by the directory service may review Web sites being registered to help insure that each site meets minimum quality standards and has been properly classified. When a directory user specifies a category of interest, Web sites classified in that category are typically listed alphabetically by site name or title, with each item in the listing being specified by a short description either submitted by the registrant, written by the reviewer, or extracted from the indexed Web site, together with a hypertext link to the described site. Users can then review the listed Web site descriptions in a category of interest, and visit those sites which appear to be of the most interest.

Automated Internet search services use programs variously called "Web crawlers," "spiders," and "robots" to seek out and automatically index Web pages. These programs build keyword-based inverted file indices which are used to rapidly process queries from users which contain one or more terms or phrases, and return to the user listings of those indexed Web pages which contain those terms or phrases. Each item appearing in the search result listing is typically described using all or part of the "title" extracted automatically from the Web page, or a short representative section of the text if the page is untitled. Each listing further includes a hyperlink to the indexed page itself, allowing the user to click on a listed item of potential interest and thereby view the indexed page in its entirety. Frequently, pages in which the search terms or phrases most frequently appear are listed first.

SUMMARY OF THE INVENTION

It is an object of the invention to better direct information which is available via the Internet to those who need or desire it.

It is a further object of the invention to enable an user to locate desired information and to differentiate between different items of such information based on its attributes.

It is a still further object of the invention to direct a user's attention to one or more passages of particular interest within the content of a larger work which is available via the Internet.

In accordance with a principal feature of the invention, information which is available via the Internet is retrieved and analyzed to form items of metadata here called "citations" which comprise the combination of one or more Uniform Resource Locations (URLs) from which source information may be retrieved, an optional specification of one or more particular portions of that source information, and one or more attribute values which characterize the information specified by the citation. These citations are combined in a citation database which is made available to users via the Internet.

Individual users employ a rendering program capable of receiving citations from the citation database, sorting and/or filtering the available citations based on a criteria specified by the user, and retrieving information specified by selected citations for presentation to the user.

As contemplated by the invention, information specified by selected citations may be pre-fetched via the Internet and placed in local storage where it will be more rapidly available for immediate review by the user.

In accordance with another feature of the invention, the attributes stored with each citation may specify subject matter categories, weighting values indicating literacy level, the presence of profanity, the popularity of the source site, rankings reflecting the approval or disapproval of other users, etc. The presence of these attributes allows the user to locally sort the retrieved citations in specified orders, or filter the citations for particular information based attribute values contained in the citations, and to differentiate between information meeting selected criteria based on each items perceived quality or usefulness.

In accordance with still another feature of the invention, each citation may include a "passage identification" which specifies a portion only of the total information identified by a given URL. The portion of the information defined by the passage identification may be selected by human editor or by automatic processing of the information retrieved. By using the passage specification, the rendering program may affirmatively direct the user's attention to those passages of particular interest. The rendering program may present the total content of the information specified by a given citation's URL at the request of the user.

As contemplated by the invention, an analysis facility located remotely from end users may generate a comprehensive collection of citations describing information obtained from numerous Internet resources and store the collected citations in an Internet server. A user can then transmit a request to the server containing a first specification which characterizes information of interest to the user. This first specification may then be compared with the citations at the server and only those citations which satisfy the first specification are then downloaded to the end user, preferably in XML format. The downloaded citations are then stored on the user's client computer where they are available to an rendering program which executes on the client computer. The rendering program is adapted to filter and/or sort the locally stored citations in accordance with a user request containing a second and more refined specification, and to present information contained in the citation, fetched via the Internet from the resource specified by the citation or both.

These and other objects, features and advantages of the present invention may be better understood by considering the following detailed description and the attached drawing.

DETAILED DESCRIPTION

System Overview

Figure 1:
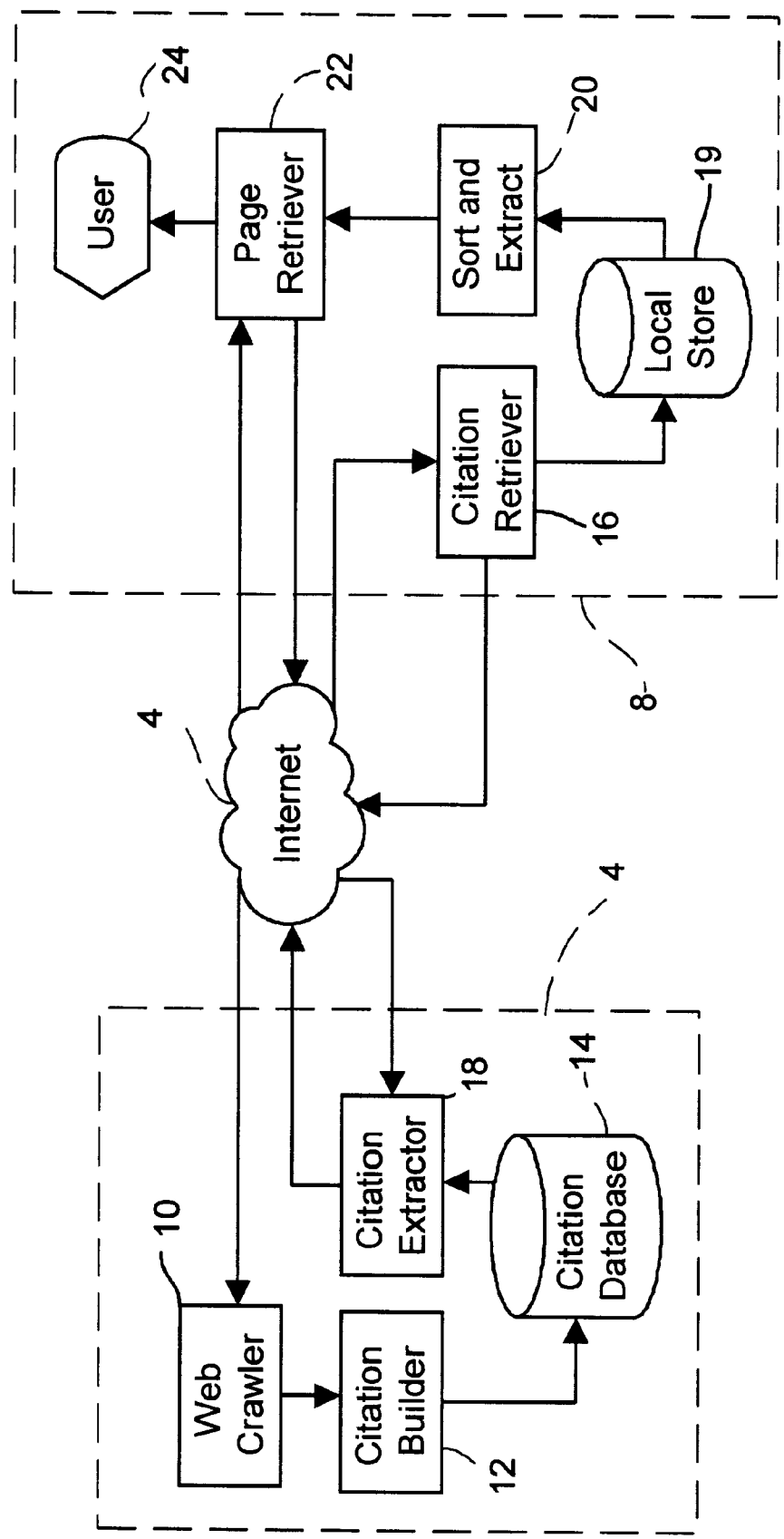
FIG. 1 is a data flow diagram depicting the principle functions performed by the preferred embodiment of the invention

FIG. 1 is a simplified illustration of the general flow of data which occurs when the preferred embodiment of the invention is used to distribute information of interest to a user. The system employs a server, shown within the dotted rectangle 4, to gather data via the Internet 5 from many different resources (not shown in FIG. 1) and then uses the Internet 5 to supply metadata "citations" describing that data to a client computer shown within the dotted rectangle 8.

The server 4 employs a data gathering mechanism, such as the Web crawler 10 seen in FIG. 1, to retrieve information from many different Internet resources. The information fetched from each resource is then passed, along with the URL of that resource, to a citation builder 12. The citation builder 12 processes the information from the resource, which may be supplemented by information from a human editor or from other sources (not shown in FIG. 1), and creates a data record called a "citation" containing metadata which describes the information from that resource. Each such citation is then stored in a citation database 14.

The client computer 8 includes a citation retriever 16 which sends a request for information to a citation extractor 18 at the server 4. In response to the request, the citation set extractor 16 returns a subset only of the collected citations in database 14 via the Internet 5 to the citation retriever 16 which stores the subset of citations in a local store 19. At the request of the user, a sort and extract unit 20 processes the citations in the local store 19 to create a filtered, sort set of citations which are passed to a page retriever 22. The page retriever 22 generates presents the information contained in or cited by these citations to the user at 24, either by displaying metadata contained in the citation or by using the URL in the citation to fetch data from the original resource described by that citation, or both.

Figure 2:
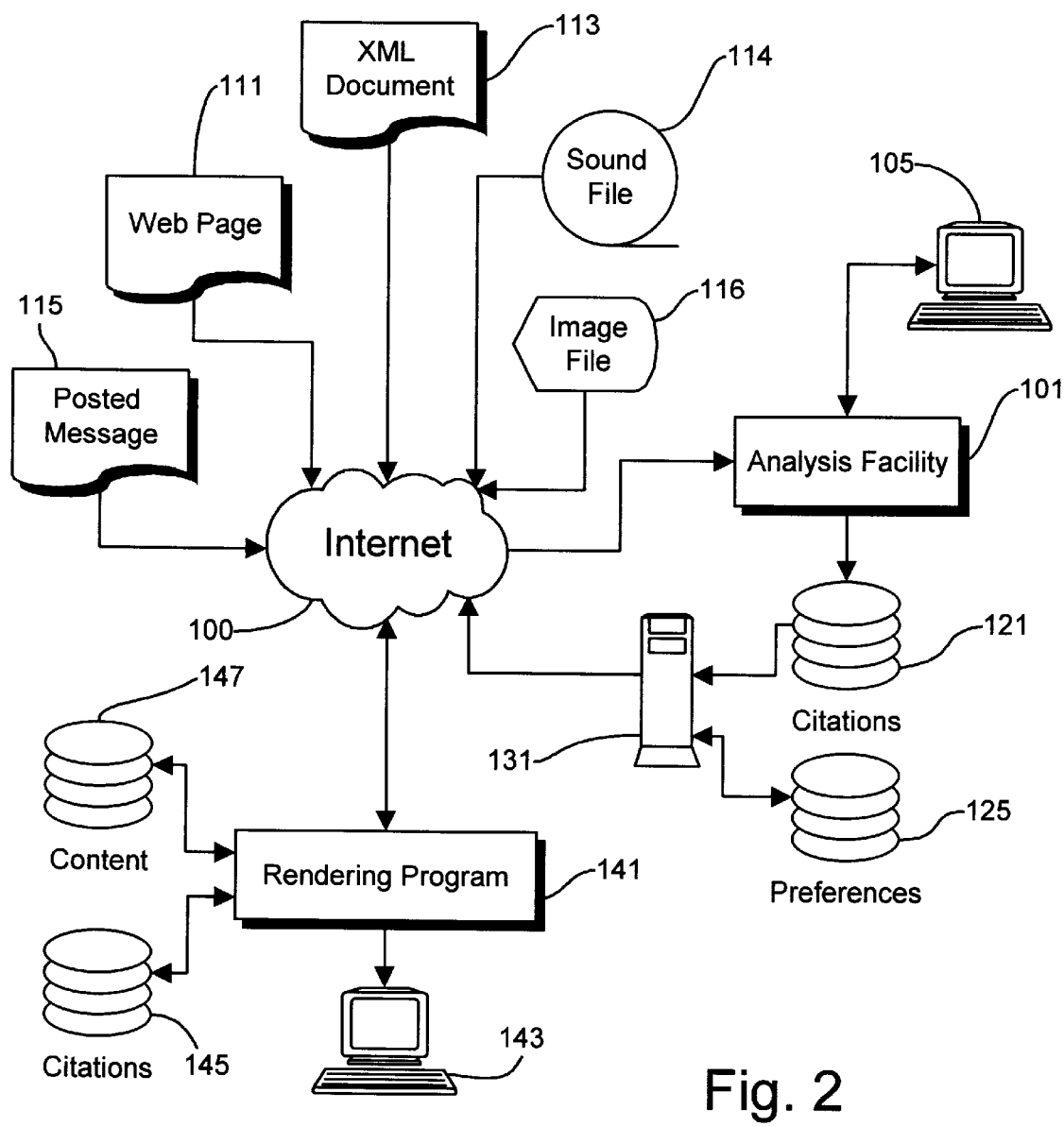
FIG. 2 is a block schematic diagram illustrating the principal components employed to implement the present invention.

As depicted in FIG. 2, which shows the principal data structures manipulated by the embodiment of FIG. 1 in more detail, the information distribution system employs an analysis facility 101 which extracts identification and content information from data retrieved via the Internet 100. The data which is retrieved and analyzed in this fashion may take a variety of forms as illustrated by the HTML Web page 111, the XML document 113, the audio file 114, the message 115 which has been posted to an Internet message board, and the image or video file 116.

The analysis facility 101 coupled to an editing station 105 processes the data from such Internet resources and creates a collection of stored descriptive metadata which are here called "citations" in a citation store seen at 121. Based on the subscriber preference information stored at 125, or in response to subscriber requests received via the Internet 100, an Internet server 131 transmits selected citations to individual users via the Internet 100.

Each user employs a rendering program 141 which presents information on a client computer 143 in response to commands from the user and/or citations previously received from the server 13 and placed in local citation storage at 145. If appropriate, the rendering program may pre-fetch data from selected Internet resources specified by some or all of the received citations 145 and store the identified data in local content storage at 147 where it will be more rapidly made available to the rendering program 141 for presentation to the user.

Citation Creation

Each of the citations created by the analysis facility 101 comprises the combination of a Universal Resource Location "URL" which specifies the Internet address of a particular Internet resource and one or more of the following additional metadata elements ("attributes").

a. a "passage identification" which specifies the beginning and ending location of an particular segment of the data identified by the URL; for example: the starting and ending character position of a portion of the text of a bulletin board message or Web page, or the identification of a particular element or nested set of elements in an XML document; and b. data characterizing the information specified by the passage identification and/or the data specified by the URL by its type, subject matter, or other characteristics.

At the analysis facility 101, the citation data placed in the store 121 may include information supplied or selected by a human editor operating the editing station 105, by automated programmed processing of the data retrieved from Internet resources, or by a combination of manual and automated techniques.

A human editor may inspect a given resource using an editing program which displays data retrieved from an Internet resource and records its URL along with the a passage identification specifying an editor-selected portion of the reviewed material, thereby designated the selected passage for special attention by the user. The beginning and ending (or beginning and length) of the selected portion is recorded in the citation, along with the specification of the attributes of the designated information. The attributes recorded by a, human editor might include a short summary of the resource's content, one or more descriptors, key words or phrases that characterize the resource or the selected portion thereof, rating values indicating quality of the resource as perceived by the editor, or its perceived degree of relevance to a particular topic.

In addition, the specified resource may be automatically analyzed under program control. By way of example, routines may be employed to generate attribute values which indicate:

a. the extent to which data obtained from a resource includes profanity;

b. the literacy level of the writing as measured by a metric such as the Flesch-Kincaid readability scale (used by Microsoft Word) or the Fog Index, a value readily calculated using the formula $4((w/s)+(b/w))$ where w=number of words in a work, s=number of sentences in the work, b=number of words in the work having 3 or more syllables;

c. the frequency of numbers within the text;

d. cross-references to related citations or URLs having a significant degree of related content;

e. the identification of, or a value indicating the extent of, references to the resource found in other resources;

f. rating values derived from usage or the approval or disapproval of other subscribers which is uploaded from the rendering programs used by subscribers as described below; and/or g. subject matter category indicators derived by processing the natural language text for matches against collections of key words or phrases which are commonly used when categories of interest designated by the indicators are being discussed.

The metadata which describes a particular resource need not be derived directly from that resource; for example, external resources which link to or which review a given resource may be used as a source of metadata which describes the given resource. By way of example, reviews or comments on a given Web site may be analyzed to develop an attribute value which quantifies the degree to which such comments and reviews were favorable or unfavorable.

Industry Standard Citation Formats

Each citation which describes a resource is preferably expressed in as a valid XML document as specified in the World Wide Web Consortium (W3C) Recommendation, *Extensible Markup Language (XML)* 1.0, Tim Bray, et al. W3C, Feb. 10 1998. See http://www.w3.org/TR/REC-xml. For interoperability with other systems, each citation stored on the server side at 121 or locally on the client side at 145 further preferably takes the form of an RDF resource description as specified by W3C's *Resource Description Framework (RDF) Model and Syntax Specification*, Ora Lassila and Ralph R. Swick, editors, Feb. 22 1999. See http://www.w3.org/TR/REC-rdf-syntax.

As noted earlier, a citation may describe the a complete Web page or a "passage" within the Web page specified by a passage identifier. In the terminology employed in the RDF Specification, a described "resource" may be an entire Web page or a part of a Web page; e.g. a specific HTML or XML element within the document source. A resource may also be a whole collection of pages; e.g. an entire Web site. Resources are always named by a Uniform Resource Identifier as described in the specification *Uniform Resource Identifiers (URI): Generic Syntax and Semantics*. See http://www.ics.uci.edu/~fielding/url/draft-fieldinfg-uri-syntax-01.txt. More specifically, a resource described in a citation which is available via the Web is identified by a Uniform Resource Locator (URL) formatted in accordance with RFC 1738, *Uniform Resource Locators (URL)*. Internet Engineering Task Force. See http://www.ietf.org/rfc/rfc1738.txt.

If a passage or "fragment" identifier is included in the URI reference then the citation's resource identifier refers only to the sub-component of the containing resource that is identified by the corresponding fragment id internal to that containing resource. When a resource takes the form of an XML document, the URI may designate all or part of the document using an Xpointer expressed in accordance with the language specifications set forth in *XML Pointer Language (XPointer)*, Eve Maler and Steve DeRose, W3C, Mar. 3 1998. See http://www.w3.org/TR/xptr. The format of the URI used by the Xpointer convention follows the related XPath specification set forth in *XML Path Language*, James Clark and Steve DeRose, editors, Nov. 16 1999. See http://www.w3.org/TR/xpath.

In addition to the use of industry standards noted above, the content of the metadata citations stored at 121 and 145 may conform to standard forms such as the "Dublin Core" described in RVD 2413, *Dublin Core Metadata for Resource Discovery*, S. Weibel, J. Kunze, C. Lagoze, M. Wolf Online Computer Library Center; University of California, San Francisco; Cornell; Reuters. September, 1998.

Rendering Program

The rendering program seen at 141 in FIG. 2 may take any of a variety of known forms, including a separately executable program, a Java applet which is downloaded from the server which also supplies the citations to the end user, or a browser plug-in program which is adapted to handle downloaded citation data files designated by an appropriate MIME identifier. Regardless of the form the rendering program takes, it is preferably capable of performing the following functions:

a. Accepting and processing a downloaded file of citations of interest from the store 121 to the user's location for local storage at 145, the downloading being performed in response to specific queries received from a user; or on a periodic basis as new citations matching the user's stored preferences are compiled. The download can be performed as an FTP or HTTP transfer of a file containing new or amended citations. A query from the user 143 may take the form of a general request for all citations, for citations only in specific categories, or for citations including attributes matching criteria specified in the query.

b. Communicating with the server 131 via the Internet 100 to provide preference or request data to the server for storage at 125. Preferences associated with a particular user and stored at 125 may be used to automatically select citations of potential interest to that user. Citations may also be selected based on specific queries received from the user which specify the attributes of desired information.

c. The rendering program 141 may include a built-in Web browser component, or operate cooperatively with a separately executable Web browser program. If desired, each URL to which an information request message is sent by the Web browser during "Web surfing" may be compared with the URLs in citations stored locally at the client at 145. In this way, if metadata is already available from the analysis facility 101 for a Web site which the user 143 desires to view, that available metadata, as well as metadata for related Web sites, can be immediately displayed to the user in a pop-up window or the like. Alternatively, a query containing the browsed-to URL can be sent by the rendering program 141 via the Internet to the analysis facility 101, which can then respond with citation metadata for the resource specified by the URL as well as related citations. As an example, if a user activates a link on a first Web page while browsing which specifies the URL of a $2^{nd}$ Web page devoted to a sports team for which a citation has been previously created by the analysis facility, the rendering program may automatically display to the user a listing of a plurality of resources containing related information. To achieve this, the rendering program may search the database of locally stored citations 145 for all citations having attributes which are shared with the citation to the browsed-to URL, or the rendering program may issue a query to the analysis facility 101 requesting that citations having attributes like those of the citation to the browsed-to URL be downloaded for display to the user. In this way, the user may be made aware of relevant information automatically as he or she browses the Web in the usual way for topics of interest.

d. Performing optional pre-fetch operations whereby information HTTP data requests are transmitted to the URL specified in each citation, and storing the information received in response to such a pre-fetch request in its entirety in the content storage unit 145 or, alternatively, storing only a predetermined portion of the information, such as that portion designed in a passage identification (if any) included with the citation. If citations meeting a user's preferences are downloaded to the client's local citation store 145 in the off-hours, and thereafter used to pre-fetch identified information into the content store 147 in advance of an anticipated user session, the user may obtain essentially immediate access to the information identified as being of potential interest to the user by the server 131.

e. Presenting (e.g., displaying on the monitor of the client computer 143 which executes the rendering program 141) listings of information specified by the citations in local store 145 but filtered, sorted and excerpted as requested by the user, the displayed listings having a content which is derived from the information contained in the citations stored at 145, from the pre-fetched content in store 147, or from resources accessed via the Internet using the resource identifiers specified in the citations in store 147, in combination with user-specified request criteria. The locally stored citations at 145 are filtered by matching the attributes stored with each citation against the user's request to determine the specific resources to be specified in the listing. The information presented may also be advantageously pre-sorted in accordance with a sort order specified by the user using one or more of the attributes as a sort key.

f. Displaying more detailed views of the resource specified by any selected citation, with the portion specified by the citation's passage identifier being highlighted or otherwise affirmatively brought to the user's attention. For example, a listing of citation, pre-sorted and filtered in accordance with criteria specified by the user, might be first displayed and, for each citation, include only the identified passages but with terms or attributes used in the sorting or filtering processes being highlighted. In this way, a user can more rapidly locate those citations [and the resources to which they refer] which are of potential interest for more detailed study. By clicking on, or otherwise selecting, a particular citation, the rendering program could display the additional content of the citation or all or some predetermined part of the content of the resource specified by the citation and fetched from the resource when selected.

g. When the content of a particular resource designated by a selected citation is to be displayed, those attributes stored in the citation which were used by the client to sort, filter or select that particular resource may be used to advantage to bring a selected portion of that resource to the users attention, either by highlighting portions of the displayed material or by scrolling the material to particular portions or both, or in some other manner more prominently display the pertinent portions of the available information. For example, if the citations each include an "Subject" attribute, and the term "Mississippi" was used to filter the citations to list only those citations with the word "Mississippi" in the Subject attribute, the rendering unit may highlight the word "Mississippi" wherever it appears, and/or automatically scroll from each occurrence of that term to the next on request.

h. Similarly, when particular passages or other portions of the information described by a citation are specified by the citation (for example, by designating the starting and ending byte locations of a text passage), those identified passages or sections may be displayed more prominently than other data to help the user "separate the wheat from the chaff." This technique of highlighting selected passages specified by citation data may be used in combination with the filtering, sorting and extraction mechanisms, or by itself, to allow the user to more rapidly identify information of interest.

i. Compiling usage information with respect to each citation viewed by the user, together with rating data (if any) expressly provide by the user, and uploading this usage and rating data to the server 131 for updating the attribute ranking data in selected citations in store 121 and/or modifying the user's preference data stored 125.

Ranking Attributes

The user's satisfaction with the information specified in a given citation may be quantified in a variety of useful ways; for example, the duration of time that a user spends viewing the information specified by a particular citation provides a measure of the user's satisfaction with the information presented, with unusually long delay times being ignored because of the likelihood that the user became distracted or terminated the session.

In addition, the rendering program 141 may include means for accepting a rating value from the user indicating the user's assessment of the quality or usefulness of that citation. If desired, a user may be permitted to compose and attach a user's review of the information specified by a particular citation, or a user-generated cross-reference to a related citation, providing an open-ended forum for review, ranking, comment, and cross-linking to be associated with each citation.

To facilitate communications between the user and the server 131, each citation may include a unique identification number. Usage indications and rating values provided by the user may then be returned to the server 131 along with the identification number of the citation. The rating values recorded with each citation in the store 121 may be periodically updated based rating and usage information provided by all users. The unique identifier which specifies each citation may also be recorded as a cross-reference in the citation to a different but related source of information.

Because the degree to which a user selects and reviews particular citations tends to indicate areas of interest to the particular user, such usage and ratings data may also be processed to update the preference data in the store 125 to better indicate the users likes and dislikes, and thereby better select the citations which should be downloaded to user for future review. Once the metadata about each cited resource is constructed it gets posted to server storage unit 121 by adding or modifying one or more of the stored metadata attribute values within the relevant citation. The revised metadata is store 121 may then be matched against user requests and downloaded to the user's local store 145.

Specific Applications and Modifications

The present invention is particularly useful in connection with Internet resources that are poorly indexed, if at all, by conventional search tools. For example, many Web sites offer bulletin boards which allow users to post information concerning particular topics. Examples include stock bulletin boards such as www.ragingbull.com where investors can post advice on selected stocks for review by potential investors. These sites typically make no attempt to differentiate messages of substantial utility from those of little worth, however, forcing the interested investor to cycle through many messages of little value to find the few that may be of particular interest. The present invention permits such messages to be ranked by a skilled reviewer and/or by users, and permits passages of particular value to be separated from the less useful portions of the message and separately classified. The rendering program can then fetch citations of interest to a particular topic (e.g., a particular stock), display the listings in order of decreasing perceived value, and initially display only those portions for each message which are deemed to be of particular interest, while allowing the user to display more detail of specific messages when desired.

It is to be understood that the embodiment of the invention which has been described is merely illustrative of one application of the principles of the invention. Numerous modification may be made by those skilled in the art without departing from the true spirit and scope of the invention.

What is claimed is:

1. The method of selectively distributing information via the Internet to a recipient which comprises, in combination,
    employing one or more computers located remotely from said recipient to perform the steps of:
        (a) retrieving information via the Internet from a plurality of different resources, each of said resources being specified by a unique URL value,
        (b) processing said retrieved information to produce a collection of citations, each of said citations describing all or part of the information from a given one of said resources and each of said citations consisting of the combination of the URL value specifying said given one of said resources and one or more attribute values which characterize the information from said given one of said resources, and
        (c) transmitting said collection of citations via the Internet from a server computer to a client computer operated by said recipient, and
    employing a client computer operated by said recipient to perform the steps of:
        (d) storing said collection of citations at said client computer,
        (e) accepting a content specification from said recipient,
        (f) extracting a subset of citations from said the collection of citations stored at said client computer by matching said content specification against corresponding attribute values in said collection of citations, and
        (g) presenting information specified by said subset of citations to said recipient.

2. The method set forth in claim 1 including the further step of employing said client computer to sort said subset of citations in an order selected by said recipient.

3. The method set forth in claim 2 wherein said step of presenting information includes the step of altering the format of the information presented to the recipient in accordance with a format specification accepted from said recipient.

4. The method set forth in claim 1 further including the step of employing said client computer to transmit information requests from said client computer to the particular URLs contained in said subset of citations and for presenting to said recipient at least specified portions of the information received in response to said requests.

5. The method set forth in claim 4 wherein each of the citations in said subset includes information identifying said specified portions.

6. The method set forth in claim 1 wherein said step of processing said retrieved information to produce a collection of citations includes the step of presenting said retrieved information for inspection by the human operator of an editing station and accepting at least some of said attribute values from said human operator.

7. The method set forth in claim 6 wherein at least one of said attribute values accepted from said human operator which forms a part of an individual citation designates a specified portion of the information described by said individual citation.

8. The method as set forth in claim 6 wherein at least one of said attribute values is accepted from said human operator to characterize said information presented for inspection by said human operator.

9. The method set forth in claim 1 wherein said citations as transmitted to said client computer are expressed in Extended Markup Language.

10. The method as set forth in claim 9 wherein said citations are expressed in accordance with the Resource Description Framework (RDF) Model and Syntax Specification.

11. The method of selectively distributing information via the Internet from a plurality of different resources to a user at a remote location comprising, in combination,
    utilizing a server computer located remotely from said user to perform the steps of:
        retrieving available data from each given one of said plurality of different resources,
        analyzing said available data from said each given one of said resources to produce a citation containing metadata describing the information retrieved from said given one of said resources and further containing the Internet address of said given one of said resources,
        accepting a first request via the Internet from said user at said remote location which specifies at least a first characteristic of the information desired by said user,
        comparing the metadata in each of said citations with said first characteristic to select a subset of said citations, and
    transmitting said subset of citations to said user at said remote location, and utilizing a client computer at said remote location to perform the steps of:
        receiving and storing said subset of citations at said client computer,
        accepting a second request from said user containing at least a second characteristic of the information desired by said user,
        modifying said subset of citations in accordance with said second characteristic to form a revised subset of citations, and
        presenting information specified by said revised subset of citations to said user.

12. The method set forth in claim 11 wherein said second characteristic specifies a sorting order and wherein said step of modifying said subset of citations comprises sorting said revised subset of citations into said sorting order.

13. The method set forth in claim 11 wherein said step of modifying said subset of citations comprises comparing each citation in said subset of citations with said second characteristic and including citations manifesting said second characteristic in said revised subset of citations.

14. The method of distributing selected information via the Internet which comprises, in combination,
    employing at least one computer located remotely from said user to perform the steps of:
        a. retrieving source data via the Internet from a plurality of different Internet resources, each of which is uniquely designated by a URL value,
        b. processing said source data to produce a plurality of citations each of which contains metadata describing said source data retrieved from a corresponding one of said Internet resources and the URL value designating said corresponding one of said Internet resources, c. accepting a first specification of desired information from a remote user, d. comparing said specification with said citations to generate a subset of those citations which contain metadata satisfying said specification, and e. transmitting said subset of citations to said remote user via the Internet, and employing a client computer operated by said remote user for performing the steps of:

f. receiving and storing said subset of citations, g. accepting from said remote user a second specification of desired information, h. processing said subset of citations to present information to said user in a form specified by said second specification.

15. The method of distributing information set forth in claim 14 wherein each citation includes an identification of at least one selected portion of the information available from the resource described by said citation and wherein said step of processing said subset of citations to present information to said user includes means for identifying said selected portion.

16. The method set forth in claim 15 wherein said means for identifying said selected portion comprises means for displaying said selected portion more prominently than other information from the resource described by said citation.

17. The method set forth in claim 14 wherein said step of processing said subset of citations to present information to the user comprises sorting said subset of citations in accordance with said second specification.

18. The method set forth in claim 17 wherein said step of processing said subset of citations to present information to the user further comprises filtering said subset of citations to present to the user only that information which satisfies said second specification.

19. The method set forth in claim 14 wherein said step of processing said subset of citations to present information to the user comprises filtering said subset of citations to present to the user only that information which satisfies said second specification.

* * * * *